(12) United States Patent
Pagani et al.

(10) Patent No.: US 8,976,010 B2
(45) Date of Patent: Mar. 10, 2015

(54) SECURITY SYSTEM FOR AT LEAST AN INTEGRATED CIRCUIT, SECURE INTEGRATED CIRCUIT CARD, AND METHOD OF SECURE WIRELESS COMMUNICATIONS

(71) Applicant: STMicroelectronics S.R.L., Agrate Brianza (MB) (IT)

(72) Inventors: Alberto Pagani, Nova Milanese (IT); Giovanni Girlando, Catania (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 210 days.

(21) Appl. No.: 13/763,707

(22) Filed: Feb. 10, 2013

(65) Prior Publication Data
US 2013/0207781 A1 Aug. 15, 2013

Related U.S. Application Data

(63) Continuation-in-part of application No. PCT/EP2011/004030, filed on Aug. 11, 2011.

(30) Foreign Application Priority Data
Aug. 11, 2010 (IT) .............................. MI2010A1536

(51) Int. Cl.
*G06K 7/00* (2006.01)
*G06K 7/10* (2006.01)
*G06K 19/02* (2006.01)
*G06K 19/07* (2006.01)
*G06K 19/073* (2006.01)
*G06K 19/077* (2006.01)

(52) U.S. Cl.
CPC .............. *G06K 7/00* (2013.01); *G06K 7/10178* (2013.01); *G06K 19/025* (2013.01); *G06K 19/072* (2013.01); *G06K 19/07327* (2013.01); *G06K 19/07336* (2013.01); *G06K 19/07735* (2013.01); *G06K 19/07756* (2013.01); CPC ........... *G06K 19/07771* (2013.01); *G06K 19/07775* (2013.01); *G06K 19/07779* (2013.01)
USPC ..................... 340/10.1; 340/572.1; 340/572.8; 340/5.74; 235/492; 361/816; 343/702; 343/841

(58) Field of Classification Search
USPC ............ 340/10.1, 572.1, 572.7, 572.8, 572.3, 340/5.74; 235/492; 361/737, 816; 343/702, 343/725, 728, 841, 872
See application file for complete search history.

(56) References Cited

U.S. PATENT DOCUMENTS

| 8,604,995 | B2 * | 12/2013 | Hammad | ...................... 343/841 |
| 8,833,664 | B2 * | 9/2014 | Choi | .............................. 235/492 |
| 2008/0265039 | A1 | 10/2008 | Skowronek et al. | |
| 2009/0152363 | A1 | 6/2009 | Kim | |

FOREIGN PATENT DOCUMENTS

| FR | 2 888 652 | 1/2007 |
| FR | 2 904 880 | 2/2008 |
| FR | 2 919 409 | 1/2009 |

\* cited by examiner

*Primary Examiner* — Toan N Pham

(74) *Attorney, Agent, or Firm* — Allen, Dyer, Doppelt, Milbrath & Gilchrist, P.A.

(57) ABSTRACT

A security system includes an integrated circuit and a transceiver/transponder circuit. The integrated circuit includes an antenna for communicating with the transceiver/transponder circuit. An inhibiting element is associated with the integrated circuit for inhibiting communications with the transceiver/transponder circuit and for securing the data contained in the integrated circuit. The inhibiting element is an electromagnetic inhibiting element. The security system further includes a coupling element associated with the antenna of the integrated circuit for temporarily deactivating the electromagnetic inhibiting element to allow communications between the integrated circuit and the transceiver/transponder circuit.

23 Claims, 8 Drawing Sheets

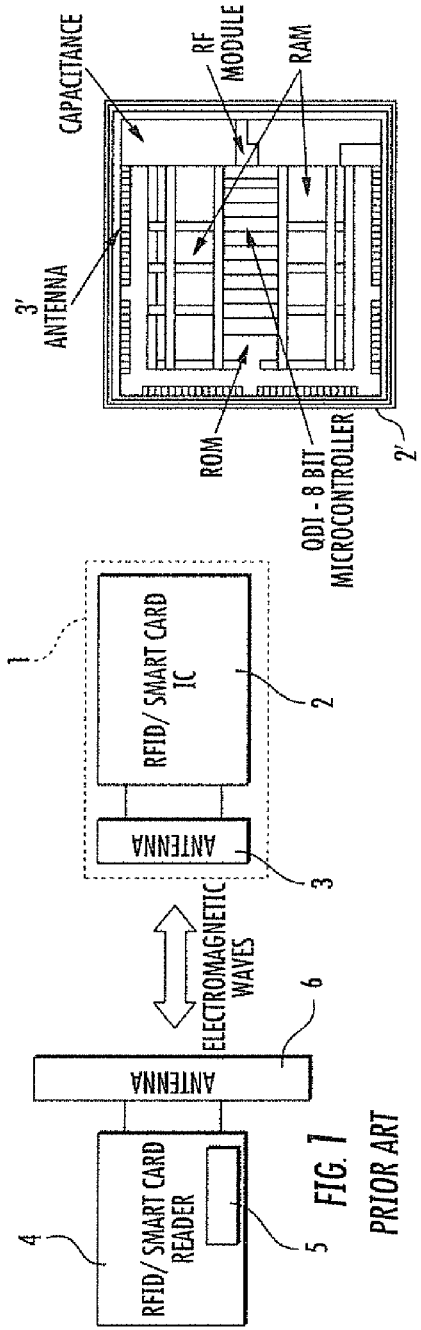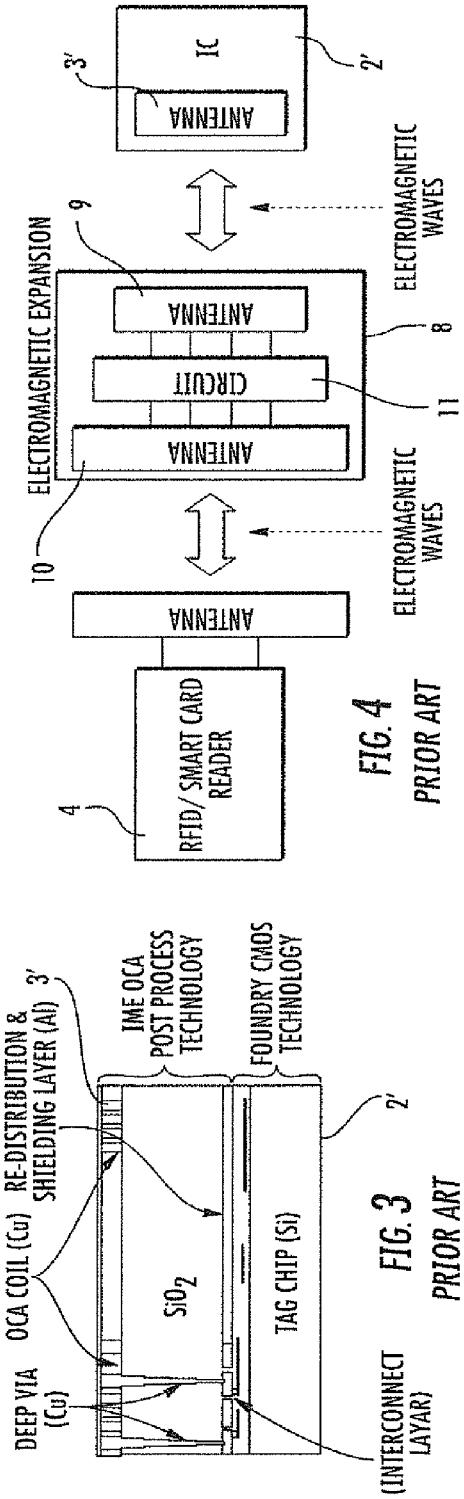

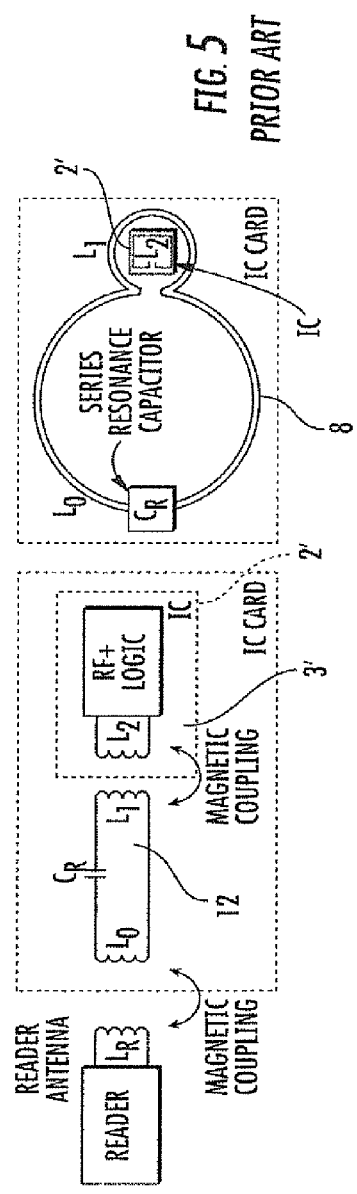
FIG. 5
PRIOR ART
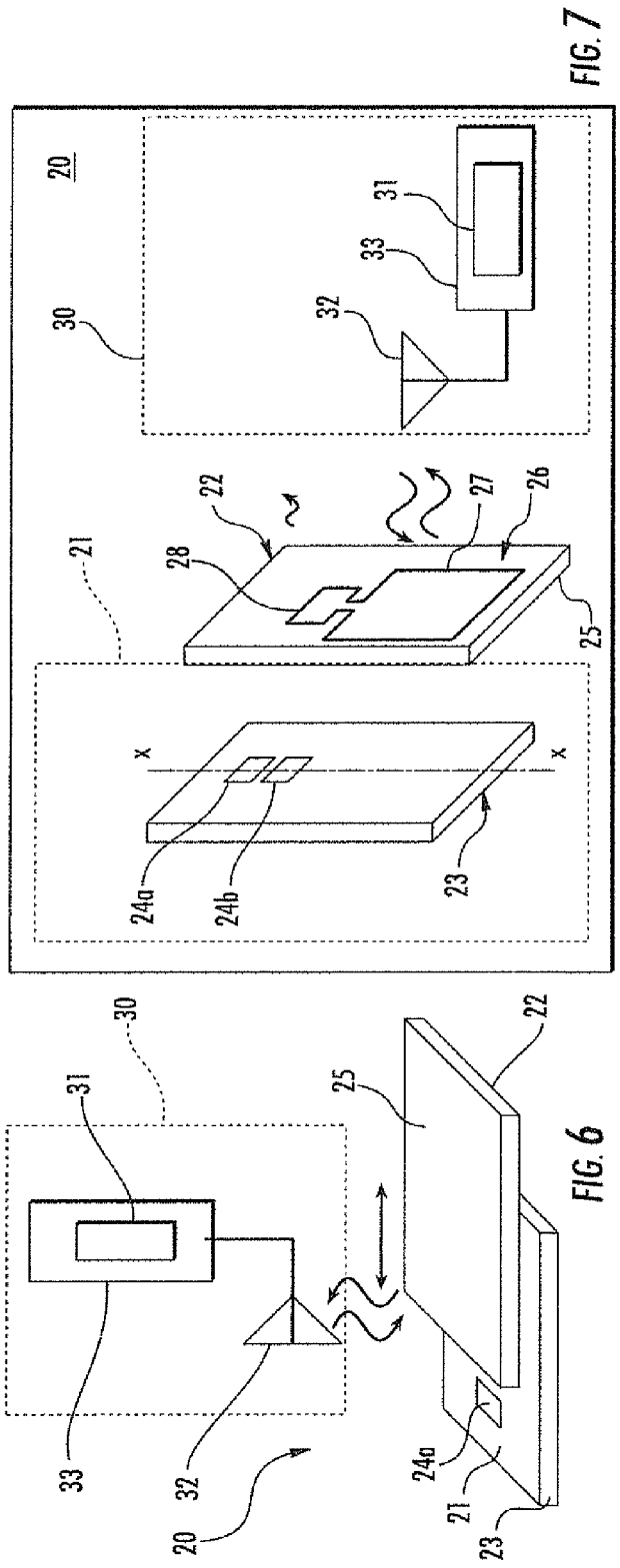
FIG. 6
FIG. 7

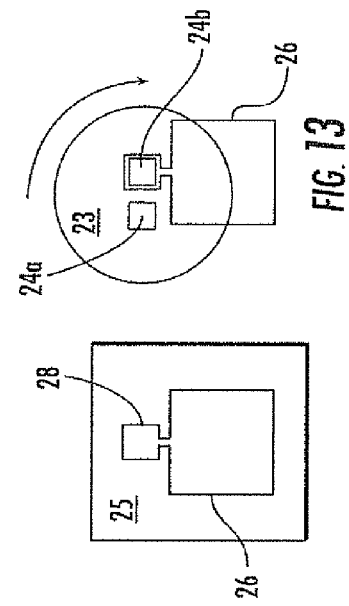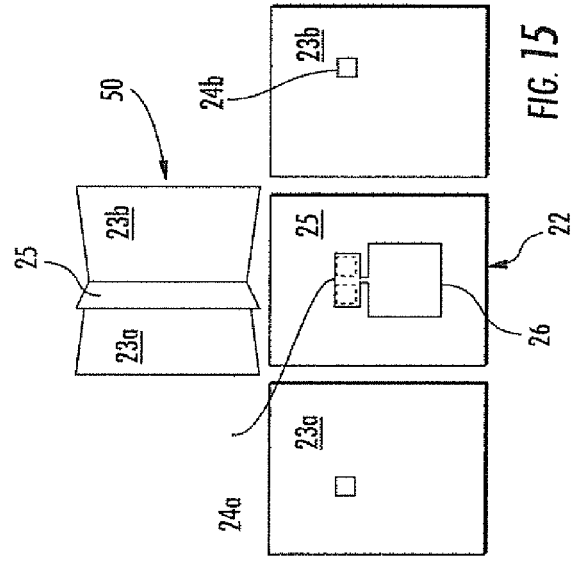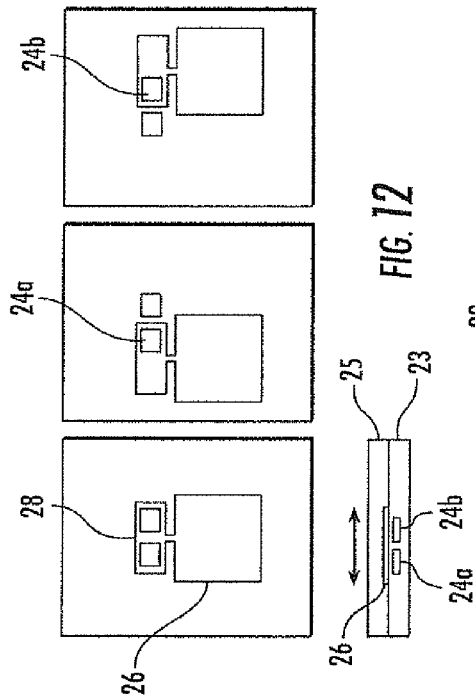

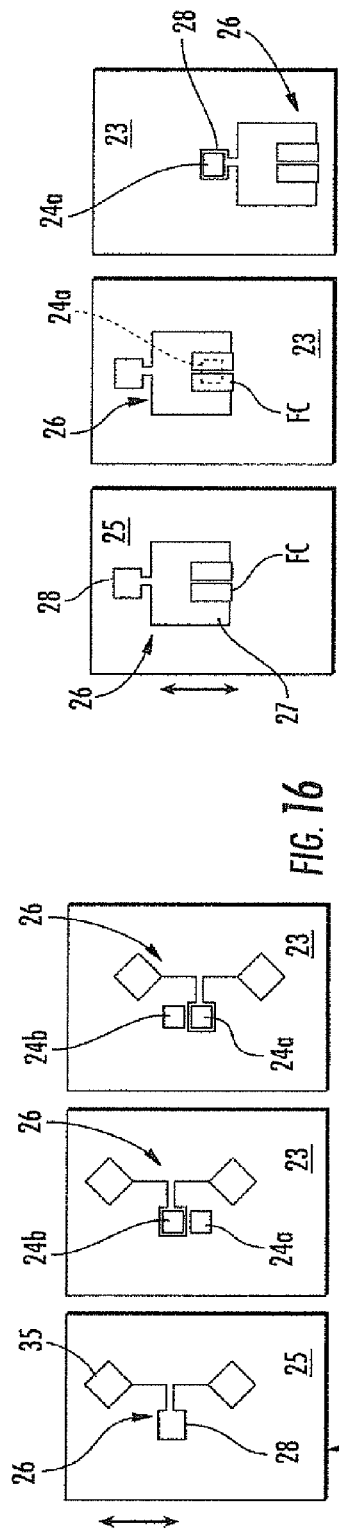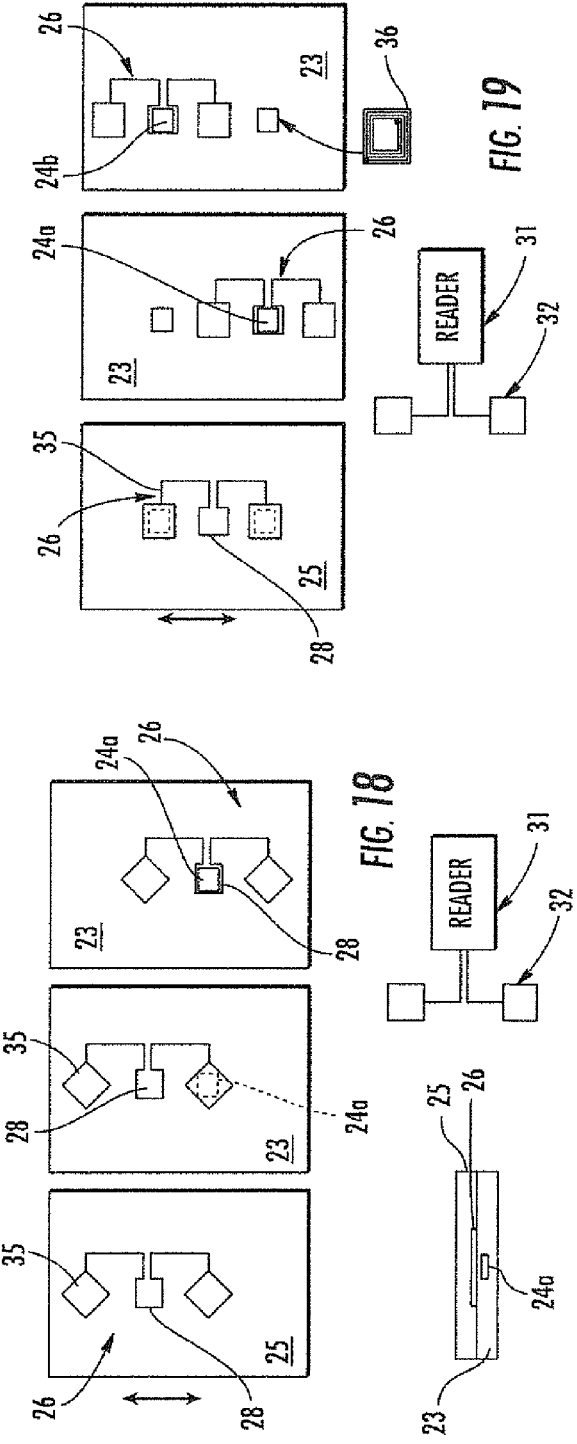
FIG. 16  FIG. 17  FIG. 18  FIG. 19

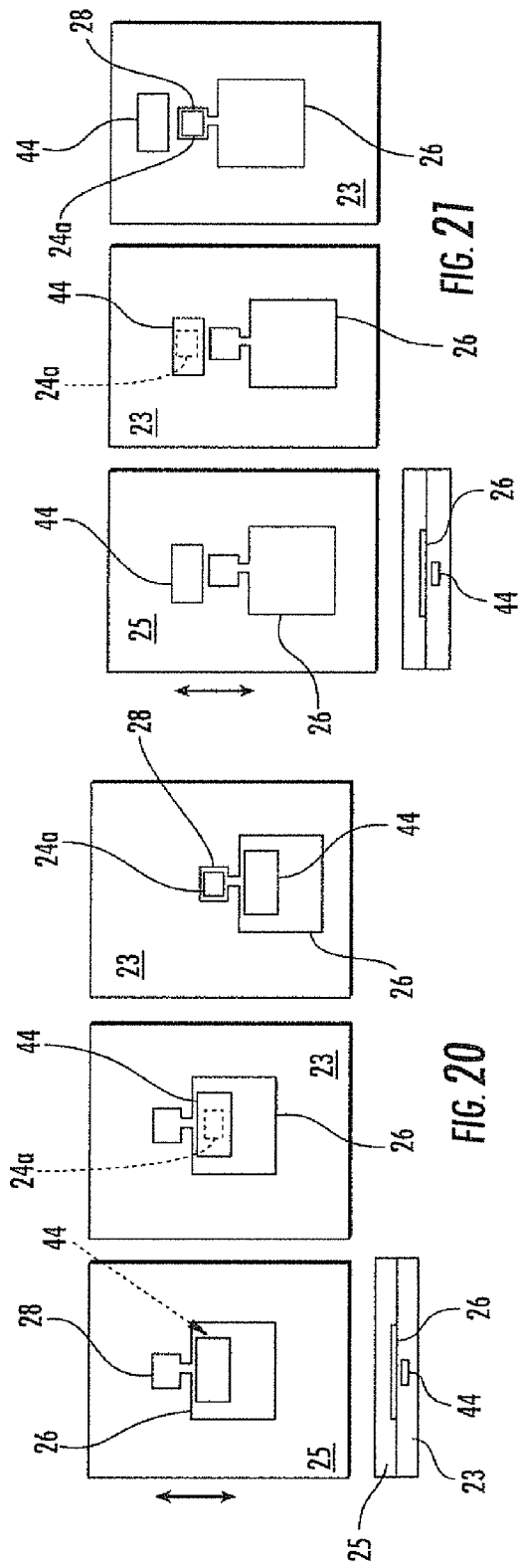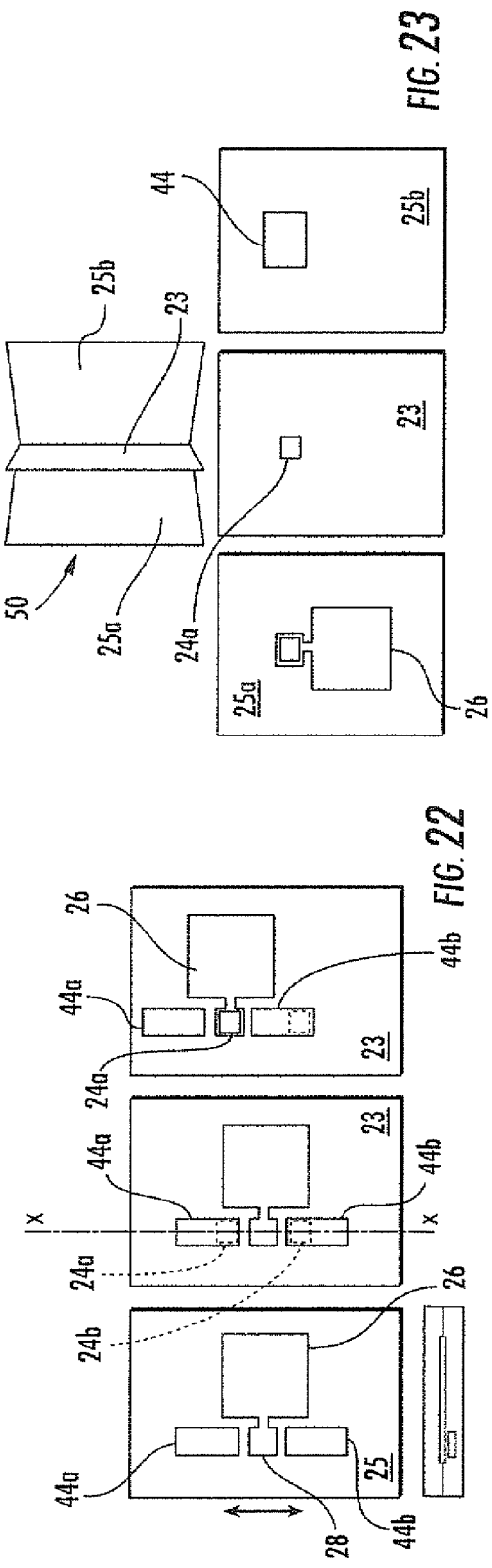

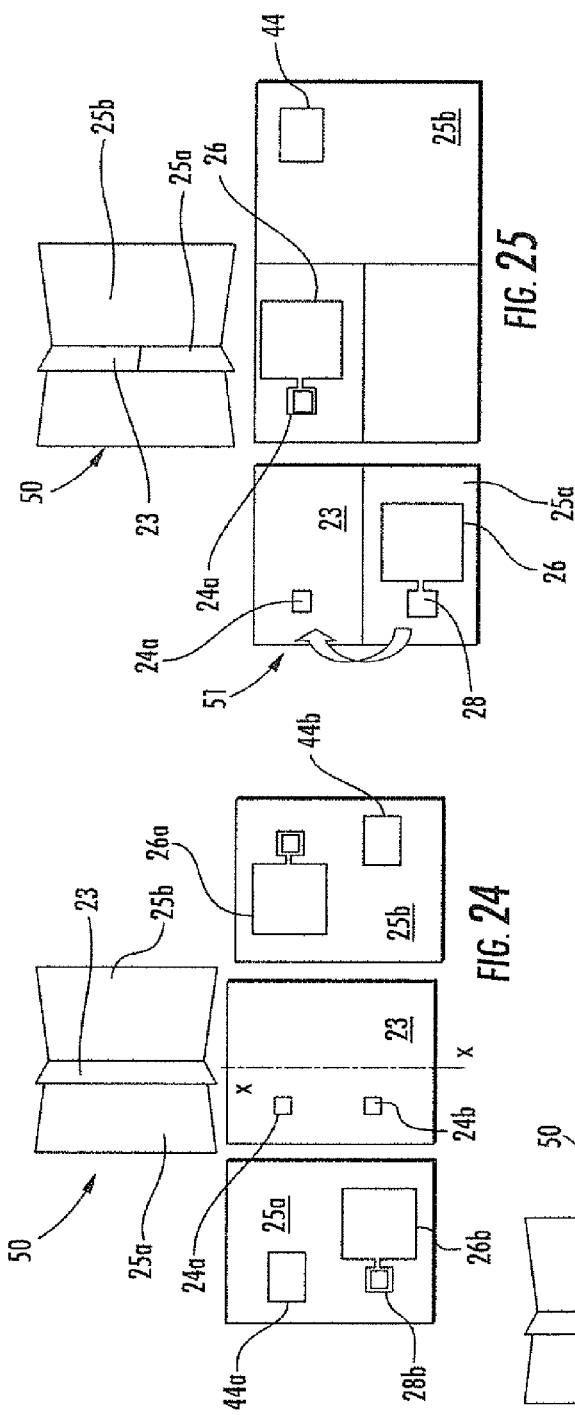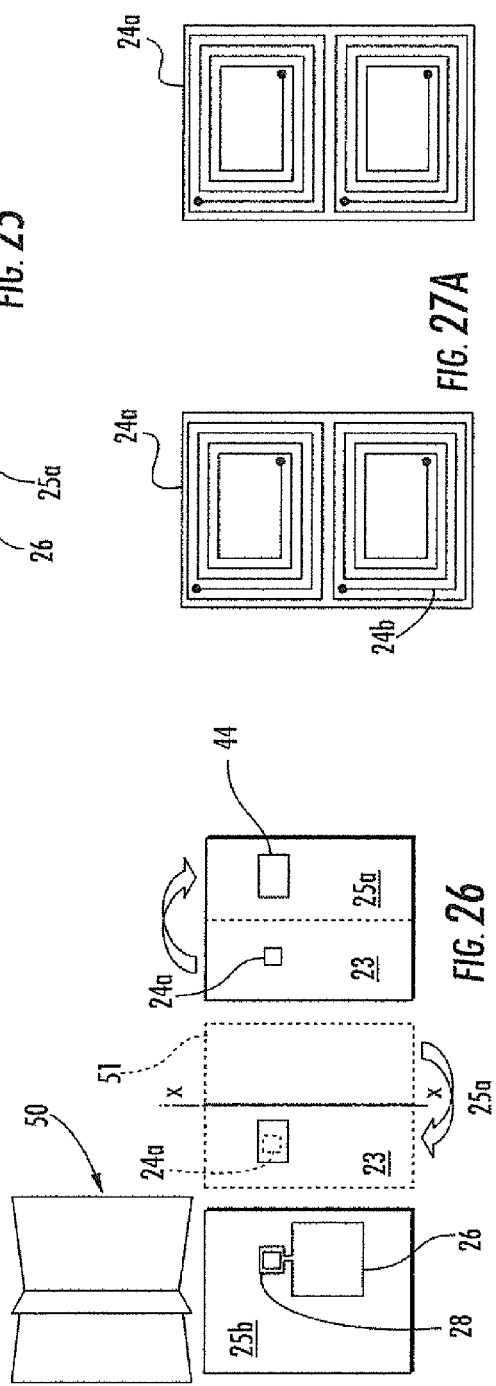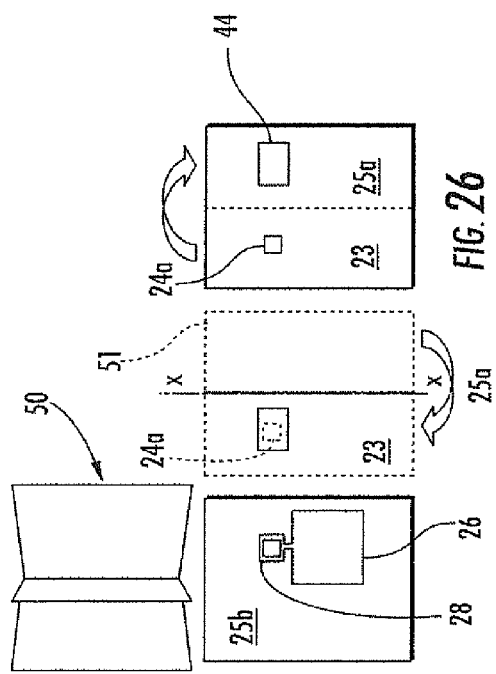

SECURITY SYSTEM FOR AT LEAST AN INTEGRATED CIRCUIT, SECURE INTEGRATED CIRCUIT CARD, AND METHOD OF SECURE WIRELESS COMMUNICATIONS

FIELD OF THE INVENTION

The present invention relates to a security system for at least one integrated circuit, and more specifically, to an integrated circuit provided with antenna for communicating with a transceiver/transponder circuit.

The present disclosure also relates to a secure integrated circuit card provided with a first support comprising at least one integrated circuit associated with at least one antenna, and a relative coupling element that is also associated with the at least one integrated circuit. The at least one integrated circuit is for communicating with a transceiver/transponder circuit.

The present disclosure also relates to a method of secure wireless communications for at least one integrated circuit, with the at least one integrated circuit being provided with at least one antenna for communicating with a transceiver/transponder circuit.

BACKGROUND OF THE INVENTION

During the last several years applications have been developed and proposed that use integrated circuits (IC) or IC Cards for containing data and/or information with respect to the user. The main applications for IC cards include the following: electronic identity documents and passports, credit cards, health and identification cards and similar applications.

In particular, these documents contain biometric data for facial identification or for identification of fingerprints or for retinal scanning. The data is contained in a memory within the integrated circuit, and for safety, can be accessed through a protection system that comprises an access system using codes/electronic keys or other similar techniques.

The integrated circuit comprises a radio-frequency identifier or RFID (Radio Frequency IDentification) or an integrated element for a secure card or Smart Card, i.e., a low power chip that, when suitably supplied through electromagnetic waves, exchanges data and information with the reader circuit (Reader) or transceiver/transponder. The electromagnetic transmission between the integrated circuit and the transceiver/transponder circuit is obtained through at least two antennas.

An example of an IC card-reader system is shown in FIG. 1. In this case, the IC card 1 comprises a first integrated circuit or first IC 2 associated with a first antenna 3 that is external to it, and a reader 4 comprising a second integrated circuit or second IC 5 associated with a second antenna 6. Once supplied, the first IC 2 and the second IC 5 exchange information by using electromagnetic waves through wireless communication channels in a mode without contact, i.e., a contactless mode.

The antennas employed generally are of the Hertzian dipole type or of the magnetic dipole type, or other equivalent antenna type. The Hertzian dipole antennas usually have large sizes and have a moderate reading distance. They are generally external to the integrated circuit, and are connected by contact projections (or bumps) or conductive wires (wire bonds). For security IC card applications the use of magnetic dipole antennas is preferred since they provide communications at a reduced distance. This is due to a magnetic coupling therebetween.

Also, IC cards with embedded antennas, or an OCA (On-Chip Antenna) system, are known, wherein an antenna 3' is integrated directly with the integrated circuit IC 2', as shown in FIG. 2. This approach, although advantageous, has the drawback of substantially increasing the surface occupied in the wafer due to the integration of the antenna. This inevitably implies a reduction of the total number of integrated circuits present on the wafer, which consequently increases the total cost.

To reduce the surface being occupied, a known approach places the embedded antenna 3' above the substrate that comprises the integrated circuit IC, thus obtaining an OCA, as shown in FIG. 3. It is also known, in particular, that IC cards with embedded antennas can use electromagnetic extensions 8 interposed between the integrated circuit 2' and the reader circuit 4, as shown in FIG. 4. The electromagnetic extensions increase the operating distance or reading range between the integrated circuit 2' and the reader circuit 4.

The electromagnetic extension 8 comprises at least two antennas 9, 10 connected through an interposed electronic circuit 11. The electromagnetic extension 8 concentrates the electromagnetic field, and thus the external electromagnetic energy on the integrated circuit IC with an embedded antenna 2'. Each antenna 9, 10 of the electromagnetic extension 8 can be a magnetic dipole or a Hertzian dipole, or other equivalent antenna type.

According to this approach, the electromagnetic extension is inserted in the container or package of the IC card, and has sizes that can be compared to the sizes of traditional IC cards. FIG. 5 shows an integrated circuit IC with an embedded antenna 2' having an electromagnetic extension 8 formed with a resonant circuit LC 12, so that the electromagnetic extension 8 is resonant at a defined and suitable frequency or frequency range.

From a functional point of view, the integrated circuit IC with an embedded antenna 2' and having the electromagnetic extension 8 of FIG. 5 is equivalent to the IC card with external antenna of FIG. 1. There is an advantage, however, in that the electromagnetic extension allows avoidance of an electrical connection through bumps or wire bonds between the integrated circuit and the external antenna.

The applications with IC cards provided with connection to a reader circuit of the wireless type, although advantageous, have the drawback of being vulnerable to remote attacks with illegitimate access to the data. In fact, during transmission of the data to the transceiver/transponder circuit or towards the IC card, possible remote attacks could overcome the mechanisms/barriers of protection and take the data contained therein. This data may then be used with potential, and even serious consequences, in respect to the privacy of the users.

Several approaches have been proposed for safeguarding the data contained in the IC cards. Naturally, the communications between the IC card and the transceiver/transponder circuit can occur through suitable protocols that allow, in some cases, cryptography of the data, at least partially, or to use access keys or protection systems. All this can also be extended to a generic chip or system coupled through the electromagnetic extension to a generic IC, SoC (System on Chip), SiP (System in Package) or to other similar type systems.

A known approach uses shields, such as, for example, casings or metallic and/or magnetic covers that allow protection of the IC card from possible attacks during transport. These shields, although advantageous under several aspects, make it more cumbersome to the IC card, and thus makes it more uncomfortable when transporting the IC cards. Moreover, after having removed the metallic and/or magnetic shield, for example, for validating one's own identity, the data is then vulnerable and can be intercepted by remote apparatuses.

In case there are two or more IC cards, being connected in a wireless manner to a single transceiver/transponder circuit, a suitable anticollision protocol avoids possible overlapping between the information and the messages as exchanged. These protocols often imply the use of communication modes of the TOM type (Time Division Multiplex) and/or FDM type (Frequency Division Multiplex) according to the cases and needs. The presence of suitable protection systems of the data is fundamental during the wireless transmission, i.e., during transmission through electromagnetic waves.

The technical problem underlying the present disclosure is that of providing a security system for protecting the wireless communications and the content of one integrated circuit in an efficient way with respect to possible remote interceptions. This is during the transmission/reception of the data and during the usual transport of the IC card. The IC card is to be compact and easy to manufacture while having structural and functional characteristics to allow the limits still affecting the protection systems realized according to the prior art to be overcome.

A further problem of the present disclosure is that of providing a secure integrated circuit card and a relative coupling element that is simple and reliable to allow protection of the data contained in the integrated circuit. In addition, secure wireless communications of the integrated circuit with a transceiver/transponder circuit having structural and functional characteristics is to be provided to allow the limits still affecting the cards according to the prior art to be overcome.

A further problem of the present disclosure is that of providing a method of secure wireless communications for one integrated circuit that is efficient and has structural and functional characteristics to allow the limits still affecting the methods of secure wireless communications according to the prior art to be overcome.

SUMMARY OF THE INVENTION

In view of the foregoing background, an object of the present invention is to protect communications of data through an electromagnetic interference, and to protect at the same time data contained in the integrated circuit in the absence of communications.

This and other objects, advantages and features in accordance with the present invention are provided by a security system comprising at least one integrated circuit and a transceiver/transponder circuit, with the at least one integrated circuit being provided with an antenna for communicating with the transceiver/transponder circuit. An inhibiting element may be associated with the at least one integrated circuit for inhibiting communications with the transceiver/transponder circuit and for securing the data contained in the at least one integrated circuit.

More particularly, the inhibiting element may be an electromagnetic inhibiting element. The security system may further comprise a coupling element that is associated with the antenna of the at least one integrated circuit for temporarily deactivating the electromagnetic inhibiting element to allow communications between the at least one integrated circuit and the transceiver/transponder circuit.

Advantageously, the coupling element may comprise at least one electromagnetic extension having a first antenna connected to a second antenna. The second antenna may have the possibility of being temporarily associated with the antenna of the at least one integrated circuit.

The electromagnetic inhibiting element may comprise an interfering element or a shielding element, or both. In particular, the electromagnetic inhibiting element may comprise a shielding element formed by at least a portion of the electromagnetic extension.

The interfering element may comprise a further integrated circuit provided with an antenna arranged next to the at least one integrated circuit. The at least one integrated circuit and the further integrated circuit may be deprived of the use of an anticollision protocol to define an electromagnetic interference. The second antenna may be selectively associated with the antenna of the at least one integrated circuit or of the further integrated circuit.

The electromagnetic inhibiting element may be a shielding element that comprises at least one electromagnetic shield interposed between the antenna of the at least one integrated circuit and the coupling element. The first antenna of the electromagnetic extension may be a Hertzian dipole antenna, and the second antenna may be a magnetic dipole antenna. The electromagnetic shield may be defined by at least one of the dipoles of the first antenna.

The at least one integrated circuit may be one integrated circuit with an embedded antenna. In particular, the embedded antenna may be an on-chip antenna. Preferably, the integrated circuit may operate at radio frequencies.

The electromagnetic shield may also be defined by an inboard capacitor of the electromagnetic extension, or by at least one preferably metallic die arranged next to the electromagnetic extension.

According to another aspect, the coupling element may be slidably associable with the at least one integrated circuit for temporarily deactivating the electromagnetic inhibiting element to allow communications between the integrated circuit and the transceiver/transponder circuit.

The system may comprise a plurality of integrated circuits provided with respective antennas and respective electromagnetic inhibiting elements that are singularly coupled to the antenna of respective integrated circuits. The coupling element may be slidably associated with the antenna of each integrated circuit for temporarily deactivating the respective electromagnetic inhibiting element to allow communications between each integrated circuit and the transceiver/transponder circuit at specific frequencies different from each other.

Advantageously, the coupling element may be the transceiver/transponder circuit. The transceiver/transponder circuit may comprise one integrated circuit with an embedded antenna, preferably an on-chip antenna.

The problem may also be addressed by a secure integrated circuit card provided with a first support comprising at least one integrated circuit associated with at least one antenna. The at least one integrated circuit may be used for communicating with a transceiver/transponder circuit. An inhibiting element may be associated with the at least one integrated circuit for inhibiting communications of the at least one integrated circuit to secure the data contained therein. The secure integrated circuit card may be characterized in that the inhibiting element may be an electromagnetic inhibiting element, and that the secure integrated circuit card may further comprise a coupling element provided with a second support that is slidably associated with the first support for temporarily coupling the coupling element with at least the antenna of the at least one integrated circuit for temporarily deactivating the electromagnetic inhibiting element and activating communications between the at least one integrated circuit and the transceiver/transponder circuit. The electromagnetic inhibiting element may comprise an interfering element or a shielding element for the at least one integrated circuit.

Advantageously, the coupling element that is associated with a secure integrated circuit card as defined above may be characterized in that the second support comprises at least one electromagnetic extension having a first antenna connected to a second antenna. The second antenna may be temporarily associated with the antenna of the at least one integrated circuit. The coupling element may further comprise suitably driven regulation means or a regulator to allow relative movement between the first support and the second support.

The problem may also be addressed by a method of secure wireless communications of at least one integrated circuit, with the at least one integrated circuit being provided with at least one antenna for communicating with a transceiver/transponder circuit. The method may comprise inhibiting the at least one integrated circuit to secure the data contained therein. In particular, the inhibiting may comprise an electromagnetic inhibiting of the at least one integrated circuit.

The method may further comprise temporarily deactivating the electromagnetic inhibiting by interposing a coupling element between the at least one antenna of the at least one integrated circuit and the transceiver/transponder circuit, and activating wireless communications between the at least one integrated circuit and the transceiver/transponder circuit. Preferably, the integrated circuit may operate at radio frequencies.

Advantageously, the coupling element may be formed by an electromagnetic extension comprising at least one first antenna associated with a second antenna. Temporarily deactivating the electromagnetic inhibiting may provide that the second antenna temporarily circumscribes at least the antenna of the at least one integrated circuit.

The electromagnetically inhibiting may use an electromagnetic inhibiting element comprising an interfering element or a shielding element, or an element that comprises both the interfering element and the shielding element.

The method may comprise a step of forming the interfering element by arranging a further integrated circuit next to the at least one integrated circuit, and depriving the further integrated circuit and the at least one integrated circuit of the use of the anticollision protocol to define an electromagnetic interference between the same.

According to a another aspect, the method may further comprise a step of forming the shielding element by arranging an electromagnetic shield next to the electromagnetic extension, with the electromagnetic shield being part of the electromagnetic extension or being independent therefrom.

The method may comprise providing a first support comprising the at least one integrated circuit, forming the coupling element in a second support, and forming the electromagnetic extension in correspondence with a surface of the second support. The step of temporarily deactivating the electromagnetic inhibiting element may provide the second support facing the first support circumscribing at least the antenna of the at least one integrated circuit to the second antenna of the electromagnetic extension. This allows relative movement of the first support and the second support through regulation means or a regulator.

The method may further comprise forming the first antenna of the electromagnetic extension with an Hertzian dipole antenna, forming the second antenna with a magnetic dipole antenna, and defining the shield through at least one of the dipoles of the first antenna.

BRIEF DESCRIPTION OF THE DRAWINGS

The characteristics and the advantages of the system and of the method according to the present disclosure may be apparent from the following description of an embodiment thereof given as a non-limiting example with reference to the annexed drawings.

FIG. 1 is a block schematic view showing an IC card and a reader realised according to the prior art;

FIGS. 2 and 3 respectively show, in a top schematic view and in a cross-sectional view, an integrated circuit IC with an embedded antenna, according to two embodiments of the prior art;

FIG. 4 shows, in a block schematic view, an IC card with an electromagnetic extension and a reader circuit according to the prior art;

FIG. 5 shows, in a block schematic view, a circuit embodiment of an IC card with an electromagnetic extension and equivalent LC circuit and a reader circuit according to the prior art;

FIG. 6 shows, in a three quarter schematic view, a system according to the present invention;

FIG. 7 shows, in a three quarter schematic view with exploded sections, the system of FIG. 6;

FIGS. 11 and 12 show, in a cross-sectional schematic view and in three plan schematic views, two embodiments of the system of FIG. 6, and in particular, of the second support in which only the electromagnetic extension is shown for greater clarity, in the plan views showing the coupling between the first and second supports;

FIG. 13 shows, in plan schematic views, a further embodiment of the system of FIG. 6;

FIGS. 14 and 15 show two further embodiments, respectively in a three quarter schematic view and in plan views, of the system of FIG. 6 integrated in paper documents;

FIGS. 16 to 26 show, in schematic views, detailed different embodiments of the system of FIG. 6;

FIGS. 27A and 27B show plan views of the first and second integrated circuits used in some embodiments of the present invention;

DETAILED DESCRIPTION OF THE PREFERRED EMBODIMENTS

Figure 8:
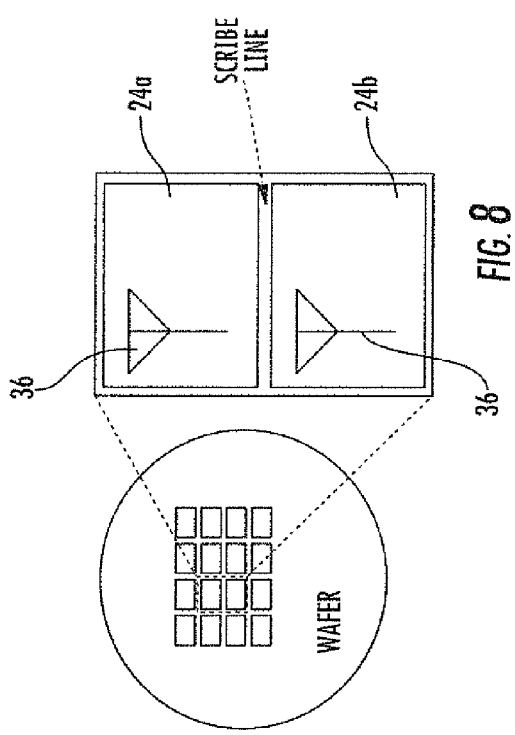
FIG. 8 shows, in a plan view, a wafer of integrated circuits used in the present invention.

With reference to these figures, and in particular to FIG. 6, reference number 20 globally and schematically indicates a security system for at least one integrated circuit that communicates in a wireless mode. The system 20 comprises at least one integrated circuit 24a provided with an antenna 36, as shown in FIG. 8, for communicating with a transceiver/transponder circuit 30.

In this specific field, everything that is referring to a transceiver circuit can be also referred to a transponder circuit. The antenna 36 can be integrated directly in the at least one integrated circuit 24a, or can be externally formed and associated with the at least one integrated circuit 24a.

The integrated circuit 24a may be associated with an IC card 21 that comprises a card-like shaped first support 23. The first support 23 can be formed out of plastic to define an identity document, a visa, a driving license, a health card, a credit card or a card for attesting the membership to a sports group, for example.

The first IC 24*a* can be within a transceiver/transponder element, i.e., a radio-frequency identification system or RFID (Radio Frequency IDentification), or a secure card or Smart Card, for example. In the present embodiment, the first IC 24*a* is one integrated circuit with an embedded antenna, also indicated as OCA (on-chip antenna). That is, it is preferred that the antenna is integrated in the chip. In the present example, the antenna is of the magnetic type. However, according to particular needs, it can be of the Hertzian or other types, for example.

The system 20 may comprise an electromagnetic inhibiting element that allows protection of the data contained in the first IC 24*a*. This avoids reading/writing of the data in an illegitimate way.

In a first embodiment, with reference to FIG. 7, the electromagnetic inhibiting element is an interfering element and comprises a second integrated circuit or second IC 24*b* preferably also of the OCA type. The electromagnetic inhibiting element is associated with the first support 23 of the IC card 21 in correspondence with the same surface wherein the first IC 24*a* is integrated. In the example shown, the first IC 24*a* and the second IC 24*b* are co-planer, and are arranged next to each other and are consecutive with respect to the longitudinal axis X-X of the first support 23.

Moreover, the interfering element is defined by the fact that the first IC 24*a* and the second IC 24*b* are deprived of the use of the anticollision protocol and thus, if activated or supplied by an external device, they simultaneously communicate and the data and the information may collide with each other. The interference between the first IC 24*a* and the second IC 24*b* makes it difficult or practically impossible for communications with the transceiver/transponder circuit 30 or an external device.

As known to one skilled in the art, the first IC 24*a* and the second IC 24*b* can be implemented to be deprived of the anticollision protocol, or the anticollision protocol can be present in each of them but disabled. In the latter case, the disabling can occur, for example, through a fuse link or through the writing of a code in a memory element, such as a non-volatile memory cell of the first IC 24*a* and of the second IC 24*b*, for example. The disabling may occur during the testing of the wafer, or at the end of the testing process.

The transceiver/transponder circuit 30 comprises at least one integrated circuit 31 associated with an antenna 32, that in the present example is of the magnetic type and formed outside the integrated circuit 31.

The system 20 also comprises a coupling element 22 that is associated with at least the antenna 36 of the first IC 24*a* or at least the antenna 36 of the second IC 24*b* for temporarily deactivating the respective electromagnetic inhibiting element. This allows communications between the first IC 24*a* or the second IC 24*b* and the transceiver circuit 30. The coupling element 22 comprises at least one electromagnetic extension 26 having a first antenna 27 connected to a second antenna 28.

The coupling element may comprise a second support 25, also card-like shaped, that is overlapped onto the first support 23. The overlap is preferably in a slidable interface. The second support 25 comprises on the surface facing the first support 23 the electromagnetic extension 26.

The electromagnetic extension 26 is implemented through a first coil 27, that defines the first antenna, and a second coil 28, that defines the second antenna. Both are substantially loops and with a square shape, and are suitably connected to each other to define magnetic dipole antennas. The electromagnetic extension 26 allows wireless communications between the transceiver circuit 30 and the first IC 24*a* or the second IC 24*b*. In particular, but not exclusively, the wireless communications is "near field" and is substantially used when the data of the communications are to be considered confidential.

The electromagnetic extension 26 has the first coil 27 having a substantially greater size with respect to the size of the second coil 28. In particular, the second coil 28 circumscribes at least the one antenna 36 of the first IC 24*a* or at least the one antenna 36 of the second IC 24*b*.

The antenna 32 of the transceiver circuit 30 communicates with the first coil 27 supplying a magnetic field that defines a first magnetic flow $\Psi 1$ that in turn allows definition, in correspondence with the second coil 28, of a second magnetic flow $\Psi 2$, with $\Psi 2$ greater than $\Psi 1$. The surface reduction of the second coil 28 has the effect of concentrating, and increasing the intensity of the electromagnetic waves that carry the data between the antenna 32 of the transceiver circuit 30 and the antenna 36 of the first IC 24*a* or the antenna 36 of the second IC 24*b* to which the second coil 28 is coupled. This allows communications between each other.

The electromagnetic extension 26 allows the action range to be expanded and the operating distance or communication range to be increased for the first IC 24*a* or for the second IC 24*b* to which the second coil 28 is coupled. The electromagnetic extension 26 allows wireless communications, at least at a specific frequency f1, between the integrated circuit to which it is coupled and the transceiver circuit 30. This reduces and at best eliminates the interfering action of the other integrated circuit that is not coupled to the second coil 28. The electromagnetic extension 26 favors communications with the integrated circuit it is coupled to, and opposed as a consequence communications with the other integrated circuits it is not coupled to.

Below explicit reference to the antenna 36 associated with and preferably integrated in the first IC 24*a* and in the second IC 24*b* for wirelessly communications may be omitted, and only those integrated circuits may be dealt with while implying the presence of each antenna.

Figure 9:
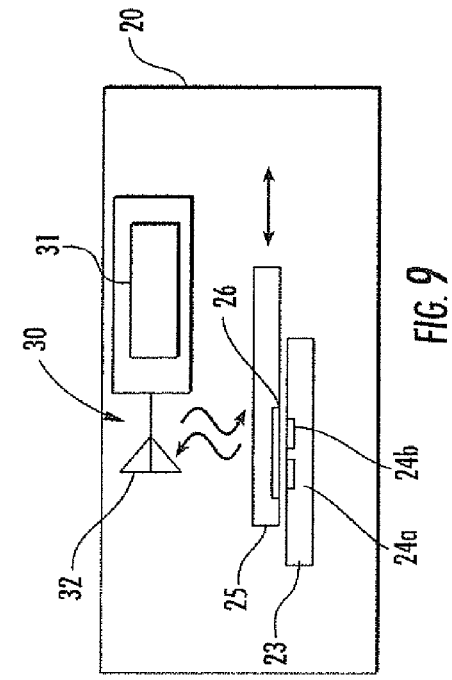
FIG. 9 shows, in a side view, the system of FIG. 6.

As shown in FIG. 9, the first support 23 and the second support 25 are slidably associated with each other. Suitable regulation means or regulator, not shown in the figures, can be arranged and driven for allowing a relative movement of the first support 23 and of the second support 25. The regulation means can be manual and thus moved by the final user for allowing wireless communications, or can be mechanical. Mechanical means or structure could be springs associated with mechanical guides or similar type mechanisms driven, for example, by optical devices. The optical devices may require the use of a transparent material for forming the first support 23 and/or the second support 25.

According to a further aspect, the first IC 24*a* and the second IC 24*b* belong to a same die of semiconductor material, derived for example, from the dicing of a wafer, operated by a saw or laser, along some of the scribe lines present on the wafer itself that divide the various chips from each other, as shown in FIG. 8. In fact, in the absence of the anticollision protocol between the first IC 24*a* and the second IC 24*b*, there may be greater interference the closer the first IC 24*a* and the second IC 24*b* are to one other.

On the first support 23 of the IC card 21 the single integrated circuits can be assembled after dicing of the wafer while taking care that they are arranged near each other. Moreover, the coupling element 22, and in particular, the second support 25, could be permanently associated with the first support 23 or be associated with the transceiver circuit 30 during wireless communications between the first IC 24a or the second IC 24b.

The reduced sizes of the first IC 24a and of the second IC 24b may be required to supply a high electromagnetic field for supplying the integrated circuits of the first support 21. This allows, in particular, a reduction of the risk of fraudulent readings.

Moreover, it is preferable that the first IC 24a and the second IC 24b are operating at high frequencies, but not exclusively in the UHF band. For example, the operating frequency may be at a frequency of 868 MHz (RFId according to the European standard) or 915 MHz (RFId according to the American standard) so as to reduce the size and the complexity of the integrated antenna 36.

The present disclosure has several embodiments all within the same inventive concept. In the following description reference may be made to the previously described system 20 and details and cooperating parts having the same structure and function may be indicated with the same reference numbers and acronyms.

Figure 10:
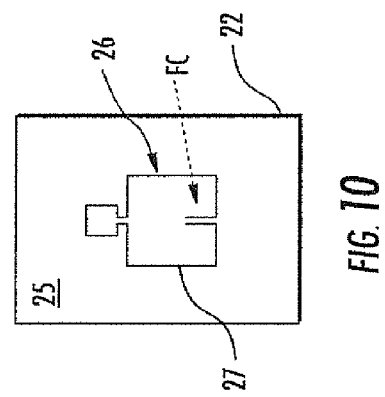
FIG. 10 shows, in a plan schematic view, a further embodiment of a second support of the system of FIG. 6.

In one embodiment, as shown in FIG. 10, the coupling element 22 comprises the electromagnetic extension 26 having an inboard capacitor (Fringing Capacitor) FC, which defines with the transceiver circuit 30, a system that is resonant at a well precise resonance frequency. The inboard capacitor FC has two armatures obtained as extensions of the board metal of the first coil 27, of the electromagnetic extension 26. The resonance frequency of the inboard capacitor FC allows the system 20 to have a further degree of safety.

Figure 11:
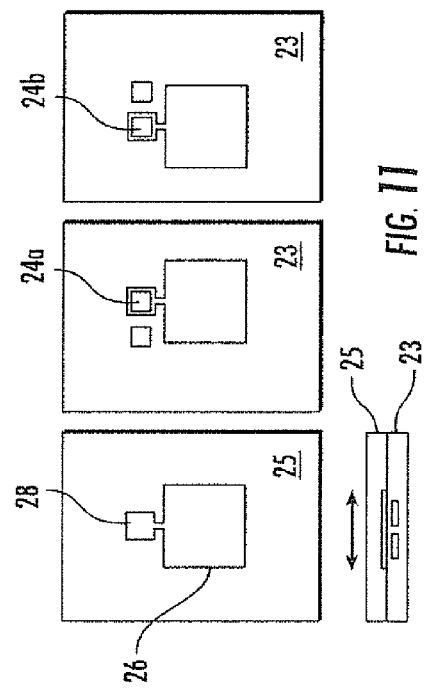

A further embodiment is shown in FIG. 11, wherein the first IC 24a and the second IC 24b are formed on the same surface of the first support 23 and are flanked or adjacent to each other. They are transversally with respect to the longitudinal axis X-X. In this case, the coupling between the second coil 28 of the electromagnetic extension 26 and respectively the first IC 24a or the second IC 24b, is defined by a lateral sliding with respect to the axis X-X of the second support 25 on the first support 23.

In the representation of FIG. 11 and in the successive representations, where there is coupling of the second support 25 onto the first support 23, only the electromagnetic extension 26 of the second support 25 will be described for greater clarity.

The embodiment shown in FIG. 12 differs with respect to the example of FIG. 11 since the second coil 28 has a shape to simultaneously contain the first IC 24a and the second IC 24b. The communications between the first IC 24a or the second IC 24b and the transceiver circuit 30 occurs through a lateral sliding of the second support 25 onto the first support 23 so that the second coil 28 separately or singularly contains the first IC 24a or the second IC 24b.

The first support 23 and the second support 25 can have any shape. In the example shown in FIG. 13, the first support 23 has a circular shape with the first IC 24a and the second IC 24b is arranged in a fixed position on a same diameter and equidistant from the center of the circle.

The coupling between the second coil 28 of the electromagnetic extension 26, integrated in the second support 25, and respectively the first IC 24a or the second IC 24b is defined by the rotation around the centre of the first support 23.

The system 20 can also be implemented in a paper document 50, such as, for example, visa and/or transitional identity cards, as shown in FIGS. 14 and 15. In the embodiment shown in FIG. 14, the first support 23 is substantially a page of the document 50 and comprises at least the first IC 24a and the second IC 24b. The coupling element 22 is defined substantially by two pages 25a and 25b of the document 50. Each page comprises respectively an electromagnetic extension, 26a, 26b for coupling respectively the first IC 24a and the second IC 24b. In the paper document 50, the page of the first support 23 is interposed between the two pages 25a and 25b of the coupling element 22.

For wireless communications, the document 50 is opened and the page of the first support 23 is coupled onto the page 25a or respectively the page 25b by circumscribing with the second coil 28 respectively the first IC 24a or the second IC 24b.

When the document 50 is closed, the first IC 24A and the second IC 24b are respectively coupled to the first and second electromagnetic extensions 26a, 26b but are deprived of the communication protocol. They interfere with each other where there are illegitimate communication attempts, thus safeguarding the respective data.

In the embodiment shown in FIG. 15, the first support 23 is defined by two pages 23a and 23b of the paper document 50. Each page comprises, respectively, the first IC 24a and the second IC 24b. The coupling element 22 is defined by a page 25 comprising an electromagnetic extension 26, which is interposed between the two pages 23a and 23b. The first coil 28 of the electromagnetic extension 26 is shaped so as to simultaneously be inside the first IC 24a and the second IC 24b.

For wireless communications with the first IC 24a, the document 50 is opened and the page of the second support 25 is coupled to the page 23a by coupling the second coil 28 of the electromagnetic extension 26 to the first IC 24a. Similarly, for communicating with the second IC 24b, the second coil 28 of the electromagnetic extension 26 is coupled to the second IC 24b contained in the page 23b.

In the embodiment shown in FIG. 16, the coupling element 22 comprises an electromagnetic extension 26 with Hertzian-magnetic dipoles, which are implemented through a Hertzian dipole antenna 35 associated with the magnetic dipole antenna 28. Such an electromagnetic extension 26 allows wireless communications in a "far field" communications. In particular, the magnetic dipole antenna 28, interposed between the dipoles of the Hertzian dipole antenna 35, has a coil that is sized to circumscribe separately the first IC 24a or the second IC 24b associated with the first support 23.

By temporarily associating the magnetic dipole 28 of the electromagnetic extension 26 with the first IC 24a or the second IC 24b, the electromagnetic inhibiting element is made inactive to allow respective communications with the transceiver circuit 30. The electromagnetic extension 26 with Hertzian-magnetic dipoles, according to the present embodiment, can advantageously be used in any of the embodiments previously shown and described.

According to a further aspect, as shown in FIG. 17, the electromagnetic inhibiting element is a shielding element, i.e., an electromagnetic shield 44, preferably but not exclusively metallic. It is associated with the coupling element 22 so that, when it covers the first IC 24a, it allows shielding of the electromagnetic waves. This protects the data contained in the first IC 24a to avoid illegitimate wireless communications.

The electromagnetic shield 44 is made from at least part of the metal that forms the electromagnetic extension 26 integrated in the second support 25 and is formed, for example, by the two armatures or dies of the inboard capacitor or Fringing Capacitor FC. These dies are obtained as extension of the edge of the first coil 27 of the electromagnetic extension 26.

In a further embodiment, as shown in FIG. 18, the first support 23 comprises a single first IC 24a and the second support 25 comprises an electromagnetic extension 26 implemented with Hertzian-magnetic dipoles, i.e., a Hertzian dipole antenna 35 associated with a magnetic dipole antenna 28.

Advantageously, the electromagnetic shield 44 is defined by at least one part of the Hertzian dipole antenna 35. With the relative movement of the second support 25 and of the first support 23, through interposed regulation device and when the magnetic dipole 28 is coupled to the first IC 24a, the data contained in the first IC 24a can be read/written through the transceiver circuit 30. In the example, the transceiver circuit 30 comprises the antenna 32 formed as a Hertzian dipole antenna for communicating with the Hertzian antenna 35 of the electromagnetic extension 26.

As shown in FIG. 19, differently from the example of FIG. 18, the first support 23 comprises the first IC 24a and also the second IC 24b. The electromagnetic inhibiting element is defined by each part of the Hertzian dipole antenna 35. The Hertzian dipole antenna 35 is moved, through A suitable regulation device, and a respective part is coupled to the first IC 24a and to the second IC 24b allowing the respective communications with the transceiver circuit 30.

The first IC 24a and the second IC 24b are provided with magnetic dipole integrated antenna 36, while the transceiver circuit 30 communicates with Hertzian dipole antenna 32. Thus, the electromagnetic extension 26 allows the wireless communications between the transceiver circuit 30 and the first IC 24a or the second IC 24b. If the electromagnetic inhibiting element is exclusively a shielding element, the disabling of the use of the anticollision protocol can be avoided.

A further embodiment, as shown in FIG. 20, is different since the electromagnetic inhibiting element is an electromagnetic shield 44 associated with a second support 25 and formed in an independent way with respect to the electromagnetic extension 26, which in the present example, is of the type with magnetic dipoles.

When the first support 23 is associated with a second support 25, the electromagnetic shield 44 shields the first IC 24a and inhibits the communications protecting the data contained in the first IC 24a. While, when the second coil 28 of the electromagnetic extension 26 circumscribes the first IC 24a, the transceiver circuit 30 wirelessly communicates with the first IC 24a.

The position, as well as the sizes of the electromagnetic shield 44, are design variables. In particular, the shield may be placed inside or outside the electromagnetic extension 26, with this latter example being shown in FIG. 21. If the electromagnetic shield 44 is external to the electromagnetic extension 26, operation problems of the electromagnetic extension 26 can be avoided.

In the embodiments of FIGS. 20 and 21, for example, with the electromagnetic shield 44 separated from the electromagnetic extension 26, the system 20 has a greater degree of freedom in the design of the extensions itself. In the embodiment shown in FIG. 22, the second support 25 comprises a first electromagnetic shield 44a and a second electromagnetic shield 44b, formed substantially like a die and is placed laterally and externally to the second coil 28 of the electromagnetic extension 26.

The first support 23 comprises the first IC 24a and the second IC 24b aligned along the longitudinal axis X-X of the first support 23. They are staggered by such a space as to contain the second coil 28 of the electromagnetic extension 26. In particular, the first electromagnetic shield 44a and the second electromagnetic shield 44b have such a length as to overhang respectively the first IC 24a or the second IC 24b when the second coil 28 is coupled to the other IC.

The system 20 with the electromagnetic inhibiting element formed like an electromagnetic shield can be implemented also in paper documents 50, such as for example, visas and/or traditional identity cards, as schematically shown in FIGS. 23 to 26 as will be described below.

In the embodiment shown in FIG. 23, the first support 23 is substantially a page comprising at least one first IC 24a interposed between other two pages, respectively 25a and 25b. The coupling element 22 is defined by the page 25a and comprises an electromagnetic extension 26, while page 25b contains the electromagnetic shield 44. The page of the first support 23 is interposed between the two pages 25a and 25b so that, when the document 50 is closed the electromagnetic shield 44 overlapped onto the first IC 24a allows the shielding, i.e., inhibiting the first IC 24a.

For communicating with the first IC 24a, the document 50 is opened and the single page of the first support 23 is coupled to the page 25a by coupling the second coil 28 of the electromagnetic extension 26 to the first IC 24a. During wireless communications it may be necessary to maintain the page 25b comprising the shield 44 separated enough from the first support 23, so as to avoid the electromagnetic shield 44 from blocking the electromagnetic waves for reaching the antenna 32 of the transceiver circuit 30.

In the embodiment shown in FIG. 24, differently from the example shown in FIG. 23, the first support 23 comprises the first IC 24a and the second IC 24b is arranged along the longitudinal axis X-X, while each of the two pages 25a and 25b comprises an electromagnetic extension 26a and 26b and a respective electromagnetic shield 44a and 44b arranged in an alternated way and is mirror like with respect to each other.

The page of the first support 23 is interposed between the two pages 25a and 25b of the second support, and when the paper document 50 is closed, each shield 44a and 44b is overlapped onto respectively the first IC 24a and the second IC 24b to allow shielding. For communications with the transceiver circuit 30, the document 50 is opened and one of the two pages 25a and 25b is overlapped onto the page of the first central support 23, simultaneously allowing shielding of one IC and communications of the other IC, in an alternated way according to the overlapped page.

In a further embodiment, as shown in FIG. 25, a page 51 of a paper document 50, separated transversally with respect to the longitudinal axis X-X, comprises in an upper portion the first support 23 while the lower portion 25a of the page 51 comprises the electromagnetic extension 26. Another page 25b of the paper document 50 facing the page 51 comprises the electromagnetic shield 44.

When the paper document 50 is closed and the pages are laid and overlapped onto each other, the electromagnetic shield 44 is overlapped onto the at least one first IC 24a to allow protection of the data contained therein. For communicating with the at least one first IC 24a, the lower portion 25a may be refolded, as highlighted by the arrow in FIG. 25, to overlap the second coil 28 onto the at least one first IC 24a.

This embodiment allows, when the paper document 50 is closed, overlapping of the shield 44 onto the at least one first IC 24a and decoupling the electromagnetic extension 26, thus increasing the protection of the data contained.

In the example shown in FIG. 26, a page 51 of the paper document 50 is longitudinally divided along the longitudinal axis X-X and a lateral portion 23 comprises at least one first IC 24a. The other lateral portion 25a of the page 51 comprises the electromagnetic shield 44. Another page 25b of the paper document 50 facing page 51 comprises the electromagnetic extension 26.

When the paper document 50 is closed with the lateral portion 25a above the lateral portion 23, the electromagnetic shield 44 is overlapped onto the at least one first IC 24a to allow protection of the data contained therein. For communicating with the transceiver circuit 30, page 51 is open and the other page 25b containing the electromagnetic extension 26 is overlapped onto the lateral portion 23 with the second coil 28 of the electromagnetic extension 26 circumscribed to the at least one first IC 24a.

This example allows protection of the data contained in the first IC 24a to be increased. In fact, the electromagnetic shield 44 is interposed between the electromagnetic extension 26 and the at least one first IC 24a when the paper document 50 is closed.

According to another aspect, the electromagnetic inhibiting element can comprise the shielding element and the interfering element. Thus, the first IC 24a and the second IC 24b can be deprived of the anticollision protocol.

In other embodiments, the first IC 24a and the second IC 24b are preferably implemented with at least two chips. Each chip is preferably provided with a magnetic dipole antenna, as schematically shown in FIG. 27A. The first IC 24a and the second IC 24b can belong to a same die of semiconductor material. In this way, it is possible to set with great accuracy the distance between the two integrated antennas 36a and 36b. However, implementations are possible where there is at least one integrated circuit 24a provided with at least two antennas, as shown in FIG. 27B.

Naturally, in case of a specific client's need, the number of chips can vary. A chip of the type RFID, for example, has very contained sizes, substantially equal to 500 μm×500 μm. This allows a reduction in the costs when there is a possibility of forming on a wafer a number of chips equal to tens of thousands.

Figure 28:
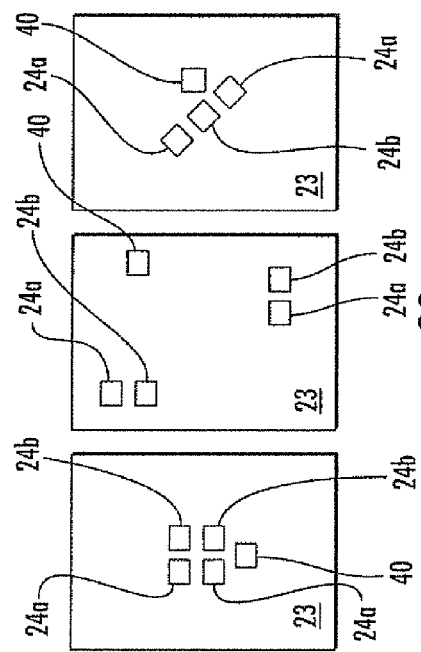
FIG. 28 shows, in plan schematic views, the first support of the system of FIG. 6 in three different embodiments.

As shown in FIG. 28, in a same first support 23 it is possible to integrate with a specific layout a variable number of first ICs 24a and second ICs 24b. This allows for the arrangement of at least one cluster with at least one first IC 24a and a second IC 24b, suitably arranged near each other, for making the effect of the electromagnetic interference more efficient. In one embodiment, the first support 23 comprises a driver IC 40 for comprising information, possibly cryptographic, so as to allow a space identification of each first IC 24a and second IC 24b or to allow a reading order, i.e., the sequence with which one has to pass from an IC to the other, or instead, the reading/writing according to a particular coding.

In other embodiments, a driver IC 40 can be made accessible and the remaining first IC 24a and second IC 24b can be made non-accessible, for example, for interference due to the lack of the anticollision protocol.

The driver IC 40 can be implemented so as to carry out a modification in the disposition of the information contained in the first IC 24a and in the second IC 24b. Alternatively, it can be implemented so as to carry out a modification in the coding of the information by a writing operation through the transceiver circuit 30.

Figure 29:
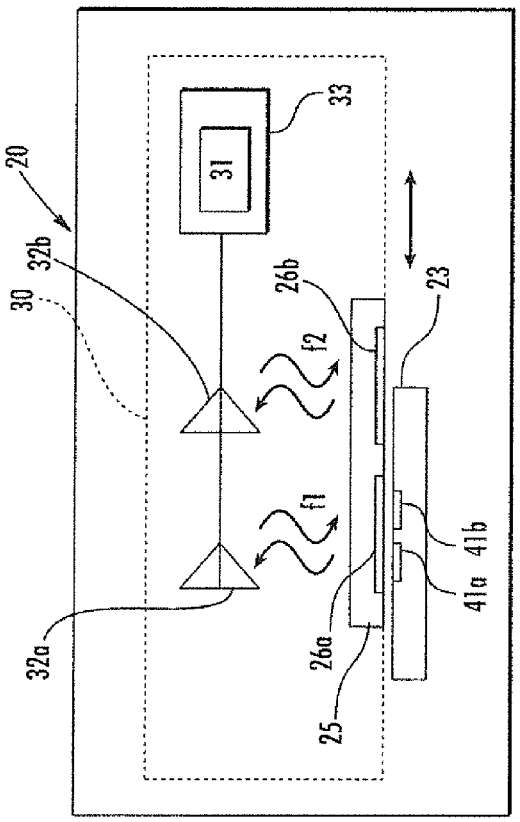
FIGS. 29 and 30 show, in respective partially sectional schematic views, two different embodiments of the system of FIG. 6.

As shown in FIG. 29, the first support 23 comprises a first cluster 41a and a second cluster 41b, each comprising at least one first IC 24a and a second IC 24b. They are arranged for communicating respectively at a first frequency f1 and at a second frequency f2, different from each other. The coupling element 22 comprises a first electromagnetic extension 26a and a second electromagnetic extension 26b that can be associated respectively with a first antenna 32a and with a second antenna 32b of the transceiver circuit 30 for allowing communications between the first cluster 41a and the second cluster 41b, respectively, at the first frequency f1 and at the second frequency f2.

Alternatively to the first antenna 32a and to the second antenna 32b, the transceiver circuit 30 can comprise a wide band communication system arranged for communicating to the first frequency f1 and to the second frequency f2.

This embodiment at two or more frequencies allows a greater protection of the data contained in the integrated circuits. This makes it even more difficult to read in an illegitimate way the content of each chip of the first cluster 41a and of the second cluster 41b.

For making it even more difficult to illegitimately read the data, the space position can be continuously changed by at least one IC or by at least one cluster present on the first support 23 of the IC card 21. This makes a preventive scanning of the surface of the support 23 necessary by at least the coupling element 22 for the IC or cluster itself.

Figure 30:
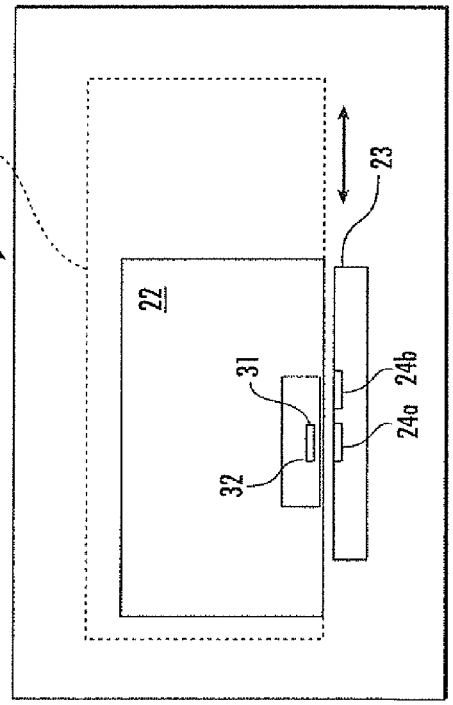

In another embodiment shown in FIG. 30, the transceiver circuit 30 also defines the coupling element 22. The integrated circuit 31 of the transceiver circuit 30 is one integrated circuit with OCA (On-Chip Antenna) and is coupled, in a faced way, respectively to the first IC 24a and to the second IC 24b to allow wireless communications. This communications is called chip-to-chip communications and supplies the power which may be necessary for the operation of the first IC 24a or of the second coupled IC 24b.

In all the above described embodiments, the sizes and the arrangements of each element can be formed according to the design needs and to the application. Advantageously, the system 20 could have additional shields for avoiding the information contained in the single integrated circuits, first IC 24a and second IC 24b, to be acquired in an illegitimate way during communications of the IC card itself with the transceiver circuit 30. This is particularly advantageous when antennas of the "far field" type are used.

In further embodiments of the above described examples, the at least one integrated circuit 24a could be associated with an external antenna 36 having different sizes, connected to the IC 24a through a bump or wire bond. In these embodiments, the communications between the at least one IC 24a and the transceiver circuit 30 occurs when the second coil 28 of the electromagnetic extension 26 circumscribes at least the external antenna 36 of the at least one IC 24a. The antennas 36 of the first IC 24a or of the second IC 24b may be arranged for communicating at a specific frequency or in a band of frequencies.

Naturally, combinations of the embodiments described and other embodiments derived from the same can be implemented, all within the same inventive concept of the present disclosure. The present disclosure also relates to a method of secure wireless communications of an integrated circuit using a system 20 as described above. Details and cooperating parts having the same structure and functions may be indicated with the same numbers and reference acronyms.

The method may comprise forming at least one first IC 24a that is provided with at least one antenna 36, preferably, but not exclusively, integrated in the at least one first IC 24a to form one integrated circuit with an embedded antenna or OCA (On-Chip Antenna). The transceiver circuit 30 is formed for communicating with the at least one first IC 24a. The transceiver circuit 30 comprises one integrated circuit 31 associated with an antenna 32.

Advantageously, the method comprises electromagnetically inhibiting the at least one first IC 24a to secure the data contained therein, and temporarily deactivating the electromagnetic inhibition by interposing a coupling element 22 between at least the antenna 36 of the at least one first IC 24a and the transceiver circuit 30, thus allowing the wireless communications.

The method provides forming the coupling element 22 by an electromagnetic extension 26 comprising at least one first antenna 27 associated with a second antenna 28. In particular, the step of temporarily deactivating the electromagnetic inhibition provides temporarily associating the second antenna 28 at least with the antenna 36 of the at least one first IC 24a to allow wireless communications with the transceiver circuit 30.

In particular, the method provides forming the second antenna 28 with such a size so as to circumscribe at least the antenna 36 of at least the first IC 24a and to form the first antenna 27 having a size substantially greater than the size of the second antenna 28 for absorbing a greater amount of the energy provided by the electromagnetic waves. In this way, a reduction of size of the second antenna 28 allows an increase in the flow and thus favors the transmission of electromagnetic waves for communications between the transceiver circuit 30 and at least the first IC 24a. The antenna 36 is coupled to the second antenna 28.

The method provides electromagnetically inhibiting the at least one first IC 24a to provide an electromagnetic inhibiting element that can be formed by an interfering element or a shielding element, or an element containing them both.

The method provides an interfering electromagnetic element by arranging a second IC 24b next to the first IC 24a as well as by depriving of the use of the anticollision protocol the first IC 24a and the second IC 24b to thus define an electromagnetic interference between the same.

In particular, when the first IC 24a and the second IC 24b are supplied, through the respective antennas 36, they communicate simultaneously and the data and the information transmitted collide with each other. This generates an interference that makes it practically impossible to read/write of the data in each of them. In one embodiment, the antenna 36 is integrated in the first IC 24a and in the second IC 24b. In a further embodiment, the antenna 36 is formed externally and is associated with the first IC 24a and with the second IC 24b.

The method provides, during wireless communications, to move the coupling element 22 through prearranged regulation means to allow relative movement of the electromagnetic extension 26 and to allow the second antenna 28 to circumscribe respectively at least the antenna 36 of the first IC 24a or of the second IC 24b. This allows a temporarily deactivation of the electromagnetic inhibition to allow at the same time communications between the transceiver circuit 30 and the first IC 24a or the second IC 24b. The method provides regulation means or a regulator of the manual or automatic type according to the needs and to the applications.

According to a further aspect, the method comprises providing a first support 23 comprising the at least one integrated circuit IC 24a, forming the coupling element 22 in a second support 25, and forming the electromagnetic extension 26 in correspondence with a surface of the second support 25.

The method then provides a temporary deactivation of the electromagnetic inhibiting element by associating the second support 25 with the first support 23 so as to face the electromagnetic extension 26 circumscribing with the second antenna 28 at least the antenna 36 of the at least one first IC 24a. The method then allows for relative movement, preferably sliding, of the first support 23 and of the second support 25, through regulation means to allow the temporary deactivation.

If the electromagnetic inhibiting element is formed by a shielding element, the method provides forming the shielding element through at least one electromagnetic shield 44, preferably metallic, formed next to the electromagnetic extension 26. This shielding element 44 can be part of the electromagnetic extension 26 or be independent therefrom by being arranged outside or inside the same. In this way, the step of electromagnetically inhibiting the at least one first IC 24a provides association of the electromagnetic shield 44 with the antenna 36 of the at least one first IC 24a to shield it, and thus protecting at least part of the data contained in the first IC 24a itself. This avoids the data being subjected to illegitimate reading/writing.

The step of temporarily deactivating the electromagnetic inhibition provides, according to what has been previously described, moving the coupling element 22, so that the second antenna 28 of the electromagnetic extension 26 circumscribes at least the antenna 36 of at least one first IC 24a.

In one embodiment in which a first IC 24a and a second IC 24b are provided, the electromagnetic inhibition element comprises both the electromagnetic shield and the electromagnetic inhibiting element. The first IC 24a and the second IC 24b are formed while depriving them also of the use of the anticollision protocol.

The method provides forming the first antenna 35 of the electromagnetic extension 26 with an Hertzian dipole antenna, and forming the second antenna 28 with a magnetic dipole antenna to define the electromagnetic shield 44 by at least one of the dipoles of the first antenna 35. The method also provides placement of the first IC 24a and the second IC 24b near each other for making it more efficient to affect the electromagnetic interference.

Naturally, further embodiments can be implemented all within the same inventive concept of the present disclosure. Even, or in particular, the method can provide a driver IC 40 suitable for comprising information, possibly cryptographic, so as to allow a space identification of each cluster or to allow an order of communications, i.e., the sequence with which one has to pass from an IC to the other or again to allow the step of communications according to a particular coding.

The method could also make a driver IC accessible, and to make non-accessible for interference. For example, this may be due to the lack of the anticollision protocol in the first IC 24a and second IC 24b.

The method provides that the driver IC 40 is accessible to allow in the driver IC 40 all the information which may be necessary to allow the step of communications with the first IC 24a and the second IC 24b, or carry out a modification in the coding of the information by a writing operation through the transceiver circuit 30.

In a further embodiment, the method provides a first cluster 41a and a second cluster 41b, both comprising at least one first IC 24a. The first cluster 41a and second cluster 41 are suitable for respectively communicating with the transceiver circuit 30 at a first frequency f1 and at a second frequency f2, with the frequencies being different from each other. The method provides the coupling element 22 by arranging respectively, a first electromagnetic extension 26a and a second electromagnetic extension 26b, and to couple them respectively to the first cluster 41a or to the second cluster 41b. The method comprises the step of temporarily deactivating the electromagnetic inhibiting element. This is formed as an interfering element or as a shielding element.

The method also provides equipping the transceiver circuit 30 with a respective first antenna 32a and a second antenna 32b communicating at the first frequency f1 and at the second frequency f2. Alternatively, the transceiver circuit 30 comprises a wide band communication system.

This embodiment increases the defense of data contained in each chip of the first cluster 41a and of the second cluster 41b, which increases the degree of difficulty for illegitimate communications of the stored data.

In a further embodiment, the method continuously exchanges the position of at least one IC or cluster, making it necessary to the complete scanning of the IC or cluster present by, for example, the coupling element 22. This increases the protection of the data, and makes it even more difficult for an illegitimate reading of the same.

In a further embodiment, the transceiver circuit 30 and the coupling element 22 are formed as a single element. The integrated circuit 31 may be an integrated circuit with an embedded antenna and faces directly the transceiver circuit 30. This allows the at least one IC 24a to have chip-to-chip communications, and supplies the power which may be necessary for the operation of the at least one IC 24a.

A main advantage of the system is that of obtaining a high protection wireless communications efficient both for "near-field" communications and for "far-field" communications. In fact, due to the electromagnetic inhibition element and to the coupling element that operate in a combined way, there is efficient protection of the data contained in each integrated circuit when the same does not communicate with the transceiver circuit.

A further advantage is given by the versatility of the system. The coupling element and the transceiver circuit can be formed as separate elements, for example. They can be associated during the communication step, but also as a single indivisible element according to the applications.

Another advantage is given by the fact that the system can be implemented by using a card-like support or a paper document or other similar items. A very secure IC or "Ultra Secure Card" or USC can thus be created.

Another advantage is given by the compactness as well as operating simplicity. Yet another advantage is given by the possibility of forming this system at substantially reduced costs. Yet another advantage is given by the possibility to use the system and the method in existing systems comprising integrated circuits. This is performed by introducing the electromagnetic inhibition element as well as the coupling element, according to the application used.

The form of the generic antenna, of the generic extension and of their typology are not limiting. The typology of the first support that comprises at least one integrated circuit as well as its form, are not limiting.

The generic electromagnetic shield can be of the metallic type or of the magnetic type, or there can be magnetic particles in the metallic material, or vice-versa, metallic particles in the magnetic material or magnetic materials can be used that have conductive properties, such as, for example, nickel or cobalt or their relative alloys. The method of wireless communications and of coding, with respect to frequency or frequency bands, are not limiting.

Obviously one skilled in the art, with the aim of meeting incidental and specific needs, may be allowed to introduce several modifications to the system and the method described or hybrid forms with respect to those shown, also together with the prior art, and all are within the scope of protection of the present invention as defined by the following claims.

The invention claimed is:

1. A security system comprising:
a transceiver/transponder circuit;
at least one integrated circuit comprising at least one antenna for communicating with said transceiver/transponder circuit;
at least one electromagnetic inhibiting element associated with said at least one integrated circuit and configured to inhibit communications with said transceiver/transponder circuit and to secure data in said at least one integrated circuit; and
a coupling element associated with said at least one antenna and configured to temporarily deactivate said at least one electromagnetic inhibiting element to allow communications between said at least one integrated circuit and said transceiver/transponder circuit.

2. The security system according to claim 1, wherein said coupling element comprises at least one electromagnetic extension comprising a first antenna and a second antenna coupled to said first antenna, with said second antenna being temporarily associated with said at least one antenna of said at least one integrated circuit.

3. The security system according to claim 2, wherein said at least one electromagnetic inhibiting element comprises at least one of an interfering element and a shielding element.

4. The security system according to claim 3, wherein said at least one electromagnetic inhibiting element comprises a second integrated circuit comprising an antenna adjacent said at least one integrated circuit, said at least one integrated circuit and said second integrated circuit being deprived of use of an anti-collision protocol to define an electromagnetic interference therebetween, with said second antenna being selectively associated with said at least one antenna of said at least one integrated circuit or of said second integrated circuit.

5. The security system according to claim 3, wherein said shielding element comprising at least one electromagnetic shield interposed between said at least one antenna of said at least one integrated circuit and said coupling element.

6. The security system according to claim 5, wherein said first antenna of said electromagnetic extension is configured as a Hertzian dipole antenna and said second antenna is configured as a magnetic dipole antenna; and wherein said electromagnetic shield is defined by at least one of the dipoles of said first antenna of said electromagnetic extension.

7. The security system according to claim 5, wherein said electromagnetic extension comprises an inboard capacitor; and wherein said at least one electromagnetic shield is defined by said inboard capacitor or by at least one metallic die arranged adjacent to said electromagnetic extension.

8. The security system according to claim 2, wherein said electromagnetic extension is configured to define at least a portion of said shielding element.

9. The security system according to claim 1, wherein each integrated circuit is configured as an integrated circuit with an embedded antenna.

10. The security system according to claim 9, wherein said embedded antenna comprises an on-chip antenna.

11. The security system according to claim 1, wherein said coupling element is configured to be slidably positioned with said at least one integrated circuit to temporarily deactivate said at least one electromagnetic inhibiting element and allow communications between said at least one integrated circuit and said transceiver/transponder circuit.

12. The security system according to claim 1, wherein said at least one electromagnetic inhibiting element comprises a plurality of electromagnetic inhibiting elements, and said at least one integrated circuit comprises a plurality of integrated circuits, with each integrated circuit comprising an antenna for communicating with said transceiver/transponder circuit, with each electromagnetic inhibiting element being singularly coupled to a respective antenna of a respective integrated circuit, and with said coupling element being slidably positioned with each antenna of each integrated circuit to temporarily deactivate each respective electromagnetic inhibiting element to allow communications between each integrated circuit and said transceiver/transponder circuit at frequencies that are different from one another.

13. The security system according to claim 1, wherein said coupling element is configured to support said transceiver/transponder circuit, and wherein said transceiver/transponder circuit comprises an integrated circuit with an embedded antenna.

14. A secure integrated circuit card comprising:
a first support comprising at least one integrated circuit comprising at least one antenna for communicating with a transceiver/transponder circuit;
at least one electromagnetic inhibiting element associated with said at least one integrated circuit and configured to inhibit communications with said at least one integrated circuit and to secure the data contained therein; and
a second support comprising a coupling element, and being slidably positioned with respect to said first support to temporarily couple said coupling element with said at least one antenna of said at least one integrated circuit to temporarily deactivate said at least one electromagnetic inhibiting element to allow communications between said at least one integrated circuit and said transceiver/transponder circuit.

15. The secure integrated circuit card according to claim 14, wherein said at least one electromagnetic inhibiting element comprises at least one of an interfering element and a shielding element for said at least one integrated circuit.

16. The secure integrated circuit card according to claim 14, wherein said second support comprises at least one electromagnetic extension comprising a first electromagnetic extension antenna, and a second electromagnetic extension antenna coupled to said first electromagnetic extension antenna, said second electromagnetic extension antenna being temporarily associated with said at least one antenna of said at least one integrated circuit, and said coupling element further comprising a regulator to allow relative movement between said first support and said second support.

17. A method of secure wireless communications for at least one integrated circuit comprising at least one antenna for communicating with a transceiver/transponder circuit, the method comprising:
electromagnetically inhibiting the at least one integrated circuit for securing data therein;
temporarily deactivating the electromagnetic inhibiting by interposing a coupling element between the at least one antenna of the at least one integrated circuit and the transceiver/transponder circuit; and
activating wireless communications between the at least one integrated circuit and the transceiver/transponder circuit.

18. The method according to claim 17, wherein the coupling element comprises at least one electromagnetic extension comprising at least one first electromagnetic extension antenna and a second electromagnetic extension antenna coupled to the first electromagnetic extension antenna, and wherein temporarily deactivating the electromagnetic inhibiting is based on the second electromagnetic extension antenna temporarily circumscribing the at least one antenna of the at least one integrated circuit.

19. The method according to claim 18, wherein the electromagnetic inhibiting is based on use of at least one electromagnetic inhibiting element comprising at least one of an interfering element and a shielding element.

20. The method according to claim 19, wherein the at least one electromagnetic inhibiting element comprises a second integrated circuit comprising an antenna adjacent the at least one integrated circuit, and further comprising depriving the at least one integrated circuit and the second integrated circuit use of an anti-collision protocol to define an electromagnetic interference therebetween.

21. The method according to claim 19, wherein the electromagnetic extension is configured to define at least a portion of said shielding element.

22. The method according to claim 19, further comprising:
providing a first support supporting the least one integrated circuit comprising the at least one antenna;
providing a second support supporting the coupling element;
wherein the at least one electromagnetic extension is formed on a surface of said second support; and
wherein temporarily deactivating the at least one electromagnetic inhibiting element is based positioning the second support with respect to the first support so that the second electromagnetic extension antenna temporarily circumscribing the at least one antenna of the at least one integrated circuit.

23. The method according to claim 18, wherein the first antenna of the electromagnetic extension is configured as a Hertzian dipole antenna and the second antenna is configured as a magnetic dipole antenna; and wherein the electromagnetic shield is defined by at least one of the dipoles of the first antenna of the electromagnetic extension.

* * * * *